(12) United States Patent
Kurfuerst et al.

(10) Patent No.: US 11,418,073 B2
(45) Date of Patent: Aug. 16, 2022

(54) ROTOR OF AN ELECTRIC MACHINE

(71) Applicant: Baumueller Nuernberg GmbH, Nuremberg (DE)

(72) Inventors: Jiri Kurfuerst, Bystrice nad Pernštejnem (CZ); Matthias Swarte, Nuremberg (DE); Florian Tafelmayer, Nuremberg (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 272 days.

(21) Appl. No.: 16/847,216

(22) Filed: Apr. 13, 2020

(65) Prior Publication Data

US 2020/0244118 A1 Jul. 30, 2020

Related U.S. Application Data

(63) Continuation of application No. PCT/EP2018/072445, filed on Aug. 20, 2018.

(30) Foreign Application Priority Data

Oct. 11, 2017 (DE) ...................... 10 2017 218 152.4

(51) Int. Cl.
*H02K 1/27* (2022.01)
*H02K 1/276* (2022.01)
*H02K 1/26* (2006.01)

(52) U.S. Cl.
CPC ............. *H02K 1/276* (2013.01); *H02K 1/265* (2013.01)

(58) Field of Classification Search
CPC .......... H02K 1/276; H02K 1/265; H02K 1/30; H02K 1/2773
See application file for complete search history.

(56) References Cited

U.S. PATENT DOCUMENTS

| 9,496,758 | B2 | 11/2016 | Kawanami |
| 10,608,485 | B2 | 3/2020 | Fröhlich et al. |
| 2006/0022541 | A1 | 2/2006 | Ong et al. |
| 2013/0241338 | A1* | 9/2013 | Mader ................. H02K 1/2773 29/598 |
| 2014/0111053 | A1* | 4/2014 | Yoshizawa ........... H02K 1/2773 310/156.53 |
| 2014/0239748 | A1 | 8/2014 | Herz et al. |

(Continued)

FOREIGN PATENT DOCUMENTS

| CN | 103997143 A | 8/2014 |
| CN | 104067482 A | 9/2014 |

(Continued)

OTHER PUBLICATIONS

Chinese Office Action dated Mar. 2, 2022 in corresponding application 201880065846.X.

*Primary Examiner* — Thomas Truong
(74) *Attorney, Agent, or Firm* — Muncy, Geissler, Olds & Lowe, P.C.

(57) ABSTRACT

A rotor of an electric machine, in particular an electric motor, comprising a rotor body which circumferentially surrounds a shaft, and with a plurality of magnets. Each of the magnets is in each case arranged within a radially extending pocket of the rotor body, and each of the pockets is connected by means of an axially extending slot, each with a radially inner chamber of the rotor body. An electric machine is also provided.

20 Claims, 10 Drawing Sheets

(56) References Cited

U.S. PATENT DOCUMENTS

| | | | |
|---|---|---|---|
| 2015/0357892 A1* | 12/2015 | Nakano | H02K 29/03 180/443 |
| 2015/0380997 A1 | 12/2015 | Song | |
| 2016/0141928 A1 | 5/2016 | Lai et al. | |
| 2018/0226850 A1* | 8/2018 | Kim | H02K 1/28 |

FOREIGN PATENT DOCUMENTS

| | | |
|---|---|---|
| DE | 102014217778 A1 | 3/2016 |
| DE | 10 2014 117 025 A1 | 5/2016 |
| DE | 10 2015 216 051 A1 | 2/2017 |
| EP | 0 413 183 A1 | 2/1991 |

\* cited by examiner

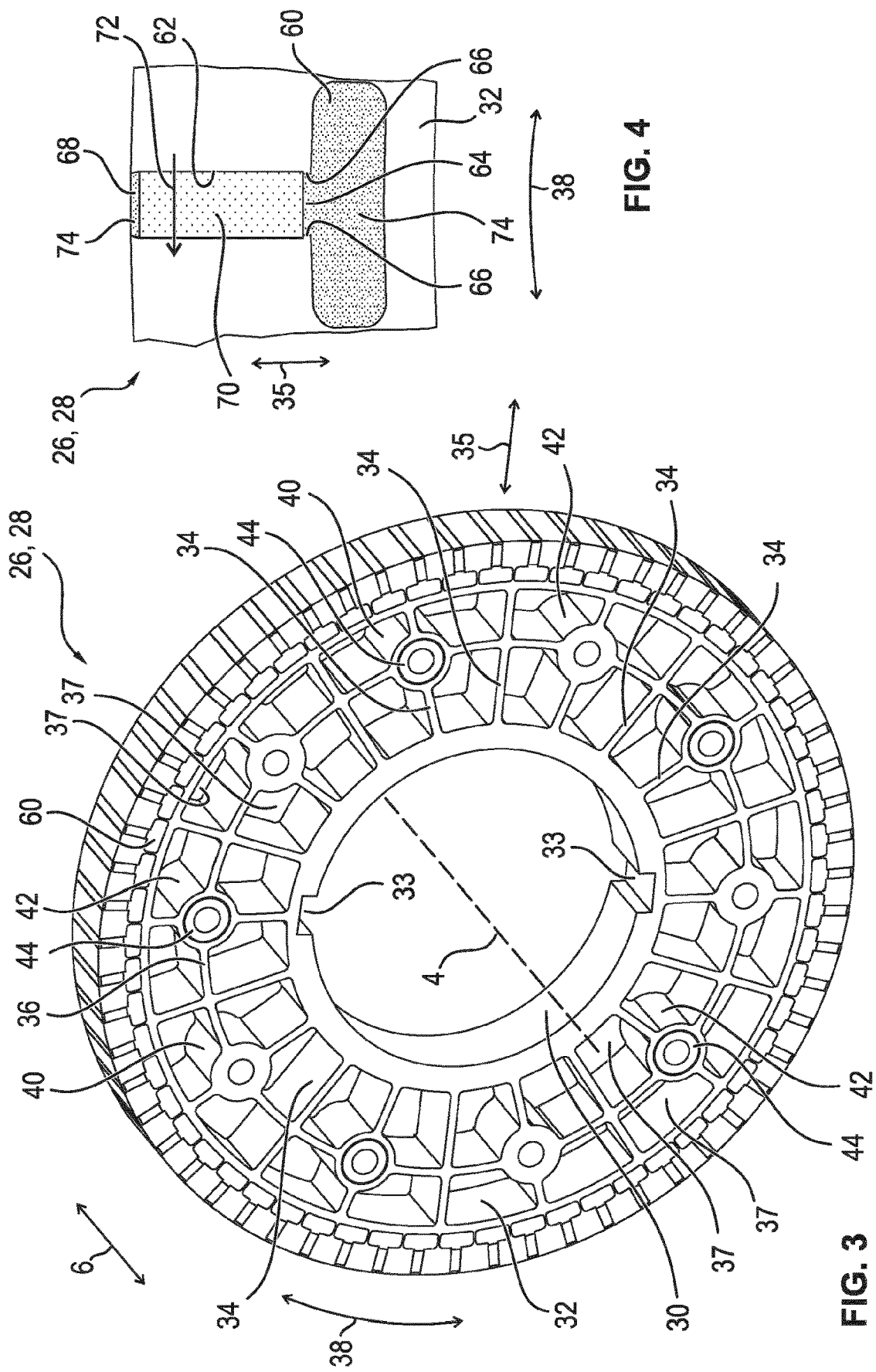

ROTOR OF AN ELECTRIC MACHINE

This nonprovisional application is a continuation of International Application No. PCT/EP2018/072445, which was filed on Aug. 20, 2018, and which claims priority to German Patent Application No. 10 2017 218 152.4, which was filed in Germany on Oct. 11, 2017, and which are both herein incorporated by reference.

BACKGROUND OF THE INVENTION

Field of the Invention

The present invention relates to a rotor of an electric machine, comprising a rotor body which circumferentially surrounds a shaft and comprising a plurality of magnets. Each of the magnets is arranged in each case within a radially running pocket of the rotor body. The invention further relates to an electric machine. The electric machine is in particular an electric motor.

Description of the Background Art

Industrial plants usually have actuators which are driven by means of an electric motor. For example, in plastics processing and the production of plastics, any screw conveyors or press rams are usually driven by an electric motor. Thus, it is not necessary to provide and install pneumatic or hydraulic lines, reducing maintenance and therefore outlay. Here, for example, a stamp or a screw of a plastic injection device is driven by means of the electric motor. Another use of electric motors can be found for example in the maritime sector, wherein the electric motor, for example, is mounted in a pod on a hull of a ship. Due to the comparatively compact design of the electric motor, it is possible to pivot the pod relative to the hull, which increases maneuverability of the ship.

In the above-mentioned application cases for the electric motor, it is necessary for the latter to provide a comparatively high level of torque. Due to a usually cramped mounting position, there is no, or only limited, space for transmission. Consequently, the torque cannot be provided, or at least not completely provided, by reducing a comparatively high speed of the electric motor. The electric motor is usually designed to be brushless, which reduces wear. The electric motor is usually supplied with current by means of a converter, which comprises in particular a bridge circuit, such as a B6 circuit. In this case, a field current can be supplied to the brushless electric motor, resulting in the formation of reluctance torque.

In order for reluctance torque to develop, it is necessary for a rotor of the electric motor to have different torques in different directions. This is accomplished by means of arranging permanent magnets in pockets of a laminated core of the rotor. Due to such an arrangement, however, there are magnetic short circuits within the laminated core, which in turn leads to a reduction in torque.

SUMMARY OF THE INVENTION

It is therefore an object of the present invention to specify a particularly suitable rotor of an electric machine as well as a particularly suitable electric machine, wherein advantageously the torque is increased.

The rotor can be a component of an electric machine. The electric machine is, for example, brushed. Preferably preferred, however, the electric machine is configured to be brushless. For example, the electric machine is a generator. However, particularly preferred, the electric machine is an electric motor, in particular a brushless electric motor. The electric machine is in particular a synchronous machine, such as a synchronous motor. Preferably, when operating, the electric machine is electrically connected to a converter and is operated by means of this or comprises the converter. The electric machine has, for example, an output between 30 kW and 150 kW, between 40 kW and 140 kW or between 60 kW and 100 kW and in particular equal to 80 kW, wherein for example in each case there is a deviation of 10 kW, 5 kW, 2 kW or 0 kW. Suitably, the electric machine has a speed, for example a nominal speed or maximum speed, between 200 rpm and 8,000 rpm, between 300 rpm and 6,000 rpm, between 500 rpm and 5,000 rpm or between 1,000 rpm and 4,000 rpm, wherein in particular there is a deviation of 100 rpm, 50 rpm, 20 rpm or 0 rpm. Particularly preferably, the electric machine has a torque, for example a maximum and/or nominal torque between 100 Nm and 20,000 Nm, between 165 Nm and 17,500 Nm, between 200 Nm and 15,000 Nm, between 500 Nm and 10,000 Nm or between 5,000 Nm and 8.000 Nm, wherein in particular in each case a deviation of 50 Nm, 20 Nm, 10 Nm or 0 Nm is present. The electric machine is, in particular, an internal rotor. The electric motor is preferably a torque motor with integrated electronics, and a converter is in particular mounted, suitably on a B-side end shield. A torque motor is understood to be, in particular, a multi-pole, direct electric drive from the group of slow-speed motors. Suitably, the torque motor has more than 20, 40 or 60 poles.

The electric machine is, for example, a part of a servo press. In other words, a press is driven in particular by means of the electric machine. As an alternative to this, the electric machine is a component of a ship's drive, which is in particular provided and set up to be mounted within a pod on a hull of a ship. Alternatively, the electric machine is preferably used in plastics processing and/or plastics production. For example, an extruder or another component of a plastic injection molding machine, such as a stamp, is driven by means of the electric machine.

The rotor has a rotor body, which circumferentially surrounds a shaft. The shaft runs along an axis in an axial direction and is, for example, cylindrical or hollow cylindrical. The rotor body is configured to be substantially hollow cylindrical and extends in the axial direction. The rotor body is preferably made of a ferromagnetic material, such as iron. The rotor body is suitably attached to the shaft in a rotationally fixed manner. In particular, the rotor body and the shaft are arranged concentrically to one another and/or, for example, rotationally symmetrical with respect to the axis. In particular, in the assembled state, the rotor is provided and arranged to be rotatable about the axis, which thus forms an axis of rotation. The shaft preferably projects beyond the rotor body in the axial direction.

The rotor body has pockets that run essentially radially. In other words, each of the pockets lies on a radial straight line with respect to the rotor body, wherein the radial straight line intersects the axis of the shaft. The pockets are axially extending recesses within the rotor body, wherein the extension of the cross section of each of the pockets perpendicular to the axis is greater in the radial direction than in the tangential direction. In particular, the pocket is substantially axially symmetric relative to the respective, radially extending straight line. The pockets are preferably structurally identical. For example, the pockets are each cuboid.

In addition, the rotor has a plurality of magnets which, in particular, are permanent magnets. The magnets are arranged in the pockets, wherein in particular each pocket is assigned one of the magnets. The pockets themselves are suitably not connected to one another and are spaced apart. Suitably, the plurality of magnets is equal to the plurality of pockets. In particular, the magnets and/or the pockets are structurally identical and preferably arranged rotationally symmetrical with respect to the axis (the shaft). In particular, each of the pockets completely receives the respective, associated magnet. In other words, the boundary of the pocket completely surrounds the respectively associated magnet, that is to say in particular in the tangential and/or radial direction. Hence, the magnets are also arranged substantially in the radial direction and thus, the rotor has a so-called "spoke" design. In particular, the pockets are radially offset inwards with respect to an outer circumference of the rotor and/or the rotor body. In other words, the magnets are buried magnets.

Each of the pockets is connected by means of an axially extending slot in each case with a radially inner chamber of the rotor body. In other words, each of the pockets is open to the associated radially inner chamber by means of the respectively assigned slot. The chamber itself is a recess and is offset radially inwards with respect to the respectively assigned pocket. The axially extending slot is, for example, an axially extending opening. The rotor body suitably has as many chambers as there are pockets, and each pocket is assigned one of the chambers. The chambers themselves are free of the magnets. In other words, none of the magnets are present within the chambers. The chambers are preferably structurally identical and are arranged, for example, rotationally symmetrically with respect to the axis of the shaft. The chambers themselves are suitably not connected to one another and spaced apart. Advantageously, each chamber is axially symmetrical with respect to the radial straight line of the associated pocket.

Due to the internal chamber, the magnetic field lines of the individual magnets are formed differently. In particular, the chamber is essentially free of magnetic field lines. As a result, the magnetic field lines essentially form on the side opposite the chamber. The torque of the rotor is in particular:

$$M = 3/2 \times p (\Psi_{PM} \times I_q + (L_d - L_q) I_d \times I_q)$$

In this case, $L_d$ and $L_q$ are predetermined based on the geometry of the rotor. Because of the chambers, $L_d$ and $L_q$ are different and the difference between them is comparatively great. As a result, the rotor has a reluctance torque, and by appropriate energization, torque is thus increased. Due to the individual chambers, the reduction in the mechanical rigidity is only comparatively modest, which is why a comparatively robust motor is provided.

For example, the extension of the slot in the tangential direction is equal to the extension of the pocket in the tangential direction, such that the slot is flush with the pocket. However, the extension of the slot in the tangential direction is preferably less than the extension of the respective pocket. As a result, inward movement of the magnet in the radial direction is in particular prevented due to the reduced extension of the slot. For example, the slot is formed by means of one or two projections arranged opposite one another, some of which form a radially inwardly offset bottom of the respective pocket.

The cross section of each chamber is suitably rounded, in particular perpendicular to the axial direction. For example, the cross section is circular and round. Due to the rounded design, the transmission of forces, caused by the interaction of the magnets with other components of the electric machine, to the shaft and vice versa is improved, which increases mechanical rigidity. As an alternative, the cross section of each chamber is, for example, a regular polygon, the corners being appropriately rounded. For example, the cross section is a square, in particular a rectangle, a hexagon or an octagon and thus honeycomb-shaped. Due to the octagonal configuration, in this case strength is increased, wherein a comparatively large volume of the respective chamber is provided. Alternatively, the polygon is preferably a triangle, which in particular has the advantages of the rounded and octagonal configuration. If the polygon is a rectangle, this is suitably disposed substantially tangentially.

Preferably, the rotor body comprises more openings, which however, for example, are spaced from the pocket and the chamber. In particular, the openings are arranged rotationally symmetrical with respect to the axis. Because of the openings, the magnetic field lines in particular are further suitably shaped. Advantageously, the openings are at least partially arranged in the tangential direction between adjacent pockets. In particular, the openings run in the axial direction. Alternatively, or in combination hereto, the rotor body has further openings, each of the chambers being assigned one of the further openings (first opening) and being offset radially inwards with respect to the latter. In particular, the openings are designed to be symmetrical to the respectively assigned radial straight line.

Alternatively, for example, further openings are offset with respect to the chambers in the tangential direction, such that there is in each case a further opening between adjacent chambers. For example, in this way, the chambers and the further openings are separated from one another by webs which, for example, have a substantially constant thickness. Due to the further openings, the magnetic field lines of the magnets are suitably shaped, wherein due to the insularity of the openings, mechanical stability is comparatively reduced.

For example, the extension of each chamber in the tangential direction is less than or the same as the extension of the respectively assigned pocket in the tangential direction. Particularly preferably, however, the extension of each chamber in the tangential direction is greater than the extension of the respective associated pocket in the tangential direction, in particular by more than 1.5, 2 or 3 times. In other words, the chamber protrudes in the tangential direction with respect to the respectively assigned pocket, in particular on both sides. Here, the extension of the chamber in the tangential direction is preferably greater than the extension of the magnet assigned to the associated pocket in the tangential direction. As a result, the spread of the magnetic field lines provided by the magnet into the radial interior of the rotor body is substantially completely suppressed, and therefore the torque of the rotor is further increased.

Advantageously, a clearance is created between each pocket and the associated magnet, at least in the tangential direction. Consequently, the respective magnet lies in the tangential direction on the boundary of the respective pocket, preferably mechanically directly. In particular, each of the magnets is provided with a coating, which, for example, prevents oxidation or similar of the permanent magnet. The coating is, for example, a resin, such as an epoxy resin. Because of the clearance, it is easier to insert the magnets into the assigned pocket. Shearing or other damage to any coating on the magnets is also prevented.

For example, the magnets are magnetized in the radial direction. The magnets are particularly preferably magnetized in the tangential direction, wherein the magnetization direction of each directly adjacent permanent magnet suitably differs. In other words, in each case north poles or south poles face towards each other. As a result, the magnetic field lines essentially emerge from or enter into the rotor body in the tangential direction between the pockets, wherein a spreading radially inward is essentially prevented due to the chambers.

For example, each of the chambers is filled with air. Each of the chambers is particularly preferably filled with a paramagnetic or diamagnetic filler, which is in particular a solid. For example, the filler is introduced into the chambers in the axial direction during manufacture. Particularly preferably, the filler is a potting which is in particular initially brought to a fluid state for filling and cured in the respective chamber. In particular, the filler is an epoxy resin. The mechanical integrity of the rotor body is increased due to the filler. Because of the paramagnetic or diamagnetic property of the filler, the magnetic field lines are prevented from spreading on the radial inner side.

For example, the rotor body is made in one piece or composed of several pieces. In particular, in this case the rotor body is prepared by means of sintering. However, the rotor body is particularly preferably a laminated core or at least comprises this. The extension of the sheets of the laminated core is in particular perpendicular to the axial direction of the rotor. Each of the laminations, for example, has an extension in the axial direction of between one millimeter (mm) and 0.1 mm, between 0.8 millimeters and 0.2 millimeters and is, for example, substantially equal to 0.5 millimeters. In particular, one layer of the rotor body is formed by means of each of the laminations. In particular, each layer is made in one piece with a single lamination. Alternatively, each of the layers has a plurality of lamination cuts joined together or suitably positioned. In particular, the lamination layers are stacked on top of one another in the axial direction.

For example, all layers of the laminations are identical. Particularly preferably, however, the rotor body has at least two partial bodies, for example, between two partial bodies and eight partial bodies and, in particular, five partial bodies. In this case, the lamination layers differ in particular between the individual partial bodies, but not within the respective partial bodies. In particular, the laminations of the individual partial bodies differ only on the basis of their orientation. As a result, a comparatively large number of identical parts can be used, which reduces manufacturing costs. Due to the different arrangement of the laminations within the respective partial bodies, in particular mechanical rigidity is increased.

For example, each of the partial bodies has in particular between 1,000 lamination layers and 2,000 lamination layers and in particular essentially equal to 1,500 lamination layers, wherein, for example, in each case a deviation of up to 200 lamination layers, 100 lamination layers or 0 lamination layers is present. For example, the individual lamination layers are fixed to one another by means of punch stacking. Particularly preferred, the individual laminations are baked together, per partial body or completely. In this case, each of the laminations is suitably provided with a coating, which is in particular at least partially liquefied by means of heating. As a result, the individual coatings of the laminations are bonded to one another when heated, which increases robustness. The rotor body is, for example, essentially formed by means of the partial body or bodies as well as by any connector, such as threaded rods.

For example, each pocket has an opening on its radial outer side. The opening is in particular a slot extending in the axial direction, and the pocket is thus open radially on the outside. Suitably, the opening extends to an (outer) surface of the rotor body. The pocket is thus designed to be open. For example, the opening is filled with air or a filler, which is in particular a paramagnetic or diamagnetic material. In particular, the opening is potted, for example with epoxy resin. Preferably, an O-ring is arranged on the end face of the rotor body, by means of which the opening is limited in the axial direction. Due to the O-ring, there is less leakage of the potting during assembly. Stress on the potting during assembly and operation of the rotor is also avoided due to the O-ring. The O-ring is made, for example, of plastic, in particular rubber. Due to the opening, the magnetic field lines of each magnet are forced further radially outward, leading to a further increased torque.

For example, the cross section of the opening is trapezoidal, wherein the cross section is in particular perpendicular to the axis. In other words, the opening is designed to be conical. Here, the two mutually parallel sides are preferably oriented in the tangential direction, and the side radially disposed further to the outside is shortened in particular in the tangential direction. For example, the trapezoid is configured to be even and/or symmetrical to the radial straight line associated with the pocket. Due to such a design, the magnets are prevented from detaching from the pocket due to centrifugal forces, so that damage to other components of the electric machine is avoided even in the case of a comparatively long operating time or a malfunction.

Suitably, the rotor body has an axially extending first hollow cylinder and an axially extending second hollow cylinder. The second hollow cylinder is arranged in particular concentrically to the first hollow cylinder and/or to the shaft. The first hollow cylinder is preferably arranged concentrically to the shaft and bears on it, for example, in particular directly. Suitably, the shaft or the first hollow cylinder has a groove extending in the axial direction, wherein the first hollow cylinder or the groove has a corresponding spring. In other words, a groove/spring connection is created between the first hollow cylinder and the shaft, wherein the groove or spring in particular run in the axial direction. Because of the groove/spring connection, torque transmission is improved between the rotor body and the shaft. Alternatively, both the shaft and the first hollow cylinder each have the groove into which a common spring is inserted.

The second hollow cylinder surrounds the first hollow cylinder and is arranged in the radial direction between the first hollow cylinder and the chambers. Here, the first hollow cylinder is spaced from the second hollow cylinder, and for example, the second hollow cylinder at least partially forms the bottom of the respective chambers. The first hollow cylinder and the second hollow cylinder are connected to each other via spokes, which run at least partially radially. In other words, the second hollow cylinder is connected to the first hollow cylinder by means of the spokes, and the spokes extend in particular in the axial direction. Appropriately, the spokes are molded onto the first hollow cylinder or the second hollow cylinder. The extension of the spokes in the axial direction is preferably equal to the extension of the first hollow cylinder in the axial direction and/or the second hollow cylinder in the axial direction. In summary, the first hollow cylinder is connected to the second hollow cylinder by means of the spokes.

For example, the rotor body has between 4 spokes and 200 spokes, between 10 spokes and 200 spokes, between 20 spokes and 200 spokes and, for example, between 40 spokes and 100 spokes. The spokes are in particular cuboid. The spokes preferably run only radially. In other words, each of the spokes runs on one assigned, radially straight line.

Because of the spokes, torque is transmitted between the first hollow cylinder and the second hollow cylinder.

For example, projections or the like directed radially outward are integrated in the second hollow cylinder, in particular molded, by means of which, for example, the boundaries of the chambers or pockets are formed. Preferably, no further components are arranged between the first hollow cylinder and the second hollow cylinder, with the exception of the struts. At least, however, openings extending in the axial direction are formed due to the two hollow cylinders and the struts, which are filled in particular with air. As a result, the weight of the rotor, and thus inertia, is reduced. The dynamics of the electric machine are therefore increased. As an alternative, the chambers are filled, for example, with a paramagnetic or diamagnetic material.

For example, the spokes run both in the radial and in the tangential direction. For example, the spokes are inclined only in a single, tangential direction and thus extend only in a single tangential direction, so for example, clockwise or counterclockwise. As a result, a preferred direction is given so that the rotor can be comparatively securely operated in a rotational direction, wherein the weight, and thus inertia, are comparatively low. Particularly preferred, however, some of the spokes are inclined in one tangential direction and the remaining ones in the other tangential direction, wherein for example the same number of spokes is inclined in the one and in the other direction. For example, the individual spokes are connected to each other, especially at the end. As a result, the spokes are mutually arranged in a sun-shaped manner. The spokes are preferably arranged in a rotationally symmetrical manner with respect to the axis of the shaft. Alternatively, or in combination hereto, the spokes intersect in the radial direction, for example, in an area between their respective ends, which further increases mechanical stability.

Particularly preferably, the rotor body comprises a third hollow cylinder which is axially extending and, for example, has the same extension in the axial direction as the first and/or second hollow cylinder. The third hollow cylinder is suitably concentrically arranged to the first and/or second hollow cylinder. At least, however, the third hollow cylinder is disposed between the first hollow cylinder and the second hollow cylinder and spaced from these. Here, the spokes cut the third hollow cylinder, which is consequently connected to the spoke. Because of the third hollow cylinder, it is possible to choose a comparatively large distance between the first hollow cylinder and the second hollow cylinder in the radial direction. In other words, it is possible to choose a comparatively large variance between the two radii of the first and the second hollow cylinder. Accordingly, comparatively large openings are formed between these two, which, however, are limited by means of the third hollow cylinder. As a result, the weight of the rotor is further reduced, which is why it has a decreased inertia.

The magnets are preferably structurally identical, which leads to reduced manufacturing costs. The magnets are particularly preferably cuboid, which facilitates positioning within the respective pocket. In particular, the extension in the tangential direction is suitably between 5 millimeters and 20 millimeters and for example equal to 10 millimeters. Suitably, one of the edge lengths of the cuboid magnets is between 10 millimeters and 40 millimeters or between 15 millimeters and 30 millimeters. Suitably, for example, the edge length is essentially 25 millimeters. Due to such dimensions, mounting is made easier. For example, the magnets are made of a ferrite that is sintered, for example. The magnets are suitably neodymium magnets, in particular NdFeB magnets.

For example, the rotor comprises between 40 magnets and 80 magnets and, for example, 60 magnets. If the rotor body has a plurality of possible partial bodies, then in particular each of the partial bodies will comprise such a plurality of magnets. As an alternative to this, each of the magnets is arranged in a plurality, in particular in all of the partial bodies. Due to such a plurality of magnets, the torque curve is evened out.

The rotor preferably comprises a second rotor body of identical construction, which is joined to the rotor body in the axial direction. The second rotor body thus also has magnets which are arranged within radially extending pockets of the second rotor body. Likewise, the second rotor body also has chambers, which are each connected with one of the pockets by means of an axially extending slot. The second rotor body is joined to the rotor body in the axial direction and in particular is fastened to it.

The pockets of the rotor body and of the second rotor body are offset from one another in the tangential direction. In other words, the pockets are not in line with each other. For example, an angle between 5 degrees and 10 degrees is formed between each adjacent pocket. As a result, a cogging torque of the rotor is reduced. For example, the two rotor bodies are mutually rotated, so that by means of rotation of the second rotor body about the shaft, the two rotor bodies are mutually congruent. Particularly preferred, however, the second rotor body can be mapped on the rotor body by means of a rotation about 180 degrees in a radial direction. As a result, it is possible for the two rotor bodies to be connected to the shaft, for example by means of a common spring or a common groove, which simplifies manufacturing. Many identical parts can also be used to manufacture the two rotor bodies, which reduces manufacturing costs. For example, the rotor has further rotor bodies, in particular three, four or five rotor bodies or more rotor bodies. All rotor bodies are suitably joined together in the axial direction. For example, the pockets of all rotor bodies are offset from one another in the tangential direction. At least, however, the pockets of rotor bodies directly adjacent to each other in the axial direction are preferably offset from one another in the tangential direction.

The invention also relates to a method for producing such a rotor. In particular, the individual laminations are first punched out of a lamination and stacked one above the other in the axial direction. In a further step, the individual laminations are attached to one another, in particular baked together. In a further step, the magnets are inserted into the pockets. Here, the magnets are already magnetized, for example. Alternatively, the magnets are magnetized after they have been inserted into the pockets. In a further step, there is in particular a potting of the pockets and/or of any openings with the paramagnetic or diamagnetic filler, thus in particular epoxy resin. For example, the rotor assembly created in this way is then placed on the shaft and fastened thereto. As an alternative, the individual laminations are placed on the shaft before baking.

The electric machine is, for example, a generator or particularly preferably, an electric motor, such as a brushless electric motor. In particular, the electric machine is a synchronous machine. The electric machine has, for example, an output between 30 kW and 150 kW, between 40 kW and 140 kW and, for example, between 60 kW and 100 kW. The nominal speed or maximum speed is suitably between 200 rpm and 8000 rpm. Particularly preferably, the torque of the electric machine which, for example, is a maximum and/or nominal torque is between 100 Newton meters and 20,000 Newton meters. The electric machine is, for example, a component of a servo press, a ship's drive or a machine for producing or processing plastic, such as a plastic injection molding machine or an extruder. The electric machine preferably comprises a converter, which in particular has a bridge circuit, such as a B6 circuit. Here, the electric machine is expediently designed as a three-phase system. The electric machine has a rotor and a stator that circumferentially surrounds the latter. In other words, the electric machine is an inner rotor. The stator expediently has a plurality of electromagnets which are supplied with current, for example by means of a converter. The electromagnets are interconnected, for example, by means of a delta or star circuit. The electric machine is preferably configured in three phases. The electric motor is preferably a torque motor with integrated electronics, and a converter is in particular expediently placed on a B-side end shield. A torque motor is meant in particular to be a multi-pole, electric direct drive from the group of slow-speed motors. Suitably, the torque motor has more than 20, 40 or 60 poles.

The stator circumferentially surrounds a rotor, which has a shaft and a rotor body surrounding the shaft on the circumference. The rotor body comprises a plurality of magnets, each of the magnets being disposed within a radially running pocket of the rotor body and each of the pockets being connected by means of an axially extending slot with a respective, radially inner chamber of the rotor body. The shaft is made of steel, for example, and in particular is a solid shaft. Alternatively, the shaft is a hollow shaft, which is preferably made of steel. Suitably, the electric machine comprises at least one bearing, by means of which the shaft is supported to be rotatable about an axis (of the shaft). The electric machine preferably comprises two bearings which are located on opposite sides of the rotor body in the axial direction. The bearings are especially roller bearings, such as ball or cylinder bearings. The bearings are preferably each connected to an end shield, by means of which, for example, a housing of the electric machine is closed on its front side. In particular, the end shields are arranged substantially perpendicular to the axis of the shaft (axis of rotation).

The further developments and advantages described in connection with the rotor are to be applied analogously to the electric machine/the manufacturing of the rotor, and vice versa.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 is a perspective view of a partial body of a rotor body,

FIG. 4 is a sectional view of a section of the rotor body,

DETAILED DESCRIPTION

Figure 1:
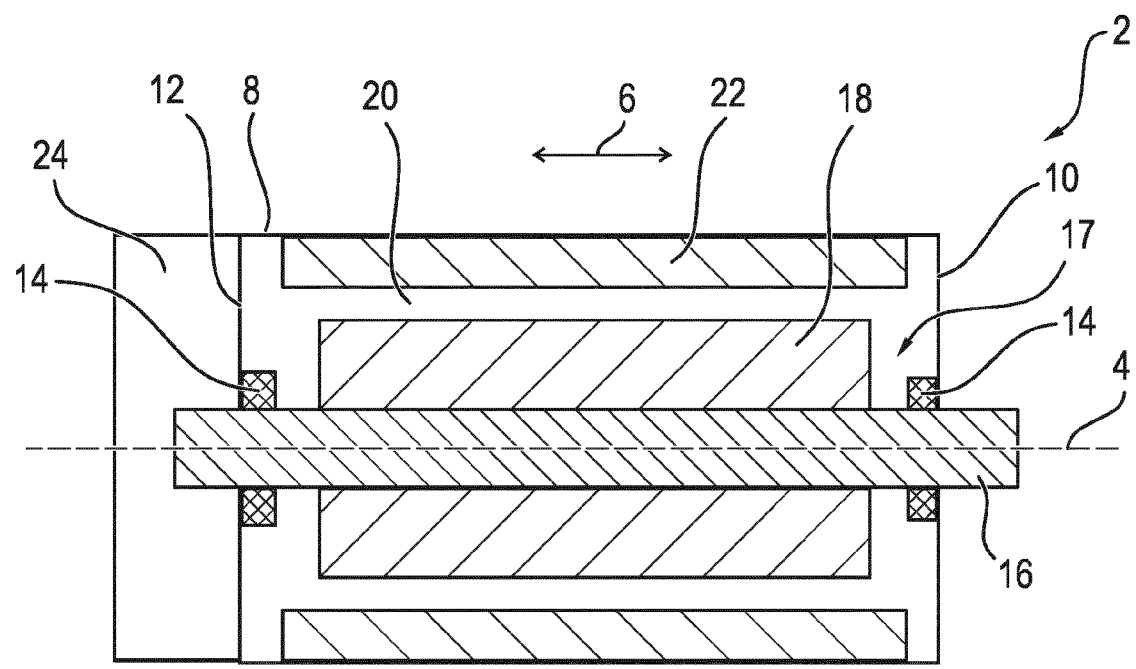
FIG. 1 is a schematic sectional view of an electric motor with a rotor.

FIG. 1 shows a simplified schematic representation of an electric machine 2 embodied as a brushless electric motor in a sectional view along an axis of rotation 4, which runs parallel to an axial direction 6. The electric machine 2 has a hollow cylindrical housing 8 which runs in the axial direction 6 and the front side of which is closed by means of an A-side end shield 10 and a B-side end shield 12. A ball bearing 14 is fastened to each of the two end shields 10, 12, by means of which a shaft 16 of a rotor 17 is rotatably mounted about the axis of rotation 4. Here, the shaft 16 is designed as a full cylinder, which is arranged concentrically to the axis of rotation 4 and is made of steel, such as stainless steel or another steel. On the shaft 16, a rotor body 18 is attached, which circumferentially surrounds the shaft 16 and which is arranged between the two ball bearings 14. Here, the rotor body 18 abuts mechanically directly on the shaft 16. The rotor body 18 is circumferentially surrounded by a stator 22, which is secured to the inside of the housing 8 so as to form an air gap 20.

The stator 22 has a plurality of electromagnets (not shown in more detail) configured as electric coils, which during operation are supplied with current by a converter 24, which is connected to the front side of the side of the B-side end shield 12 that is opposite the rotor 17. The stator 22 has a total of thirty-six coil groups, each with two electric coils. The energization of the electromagnets is carried out in dependence of the current position of the rotor 17 with respect to the stator 22, which is determined by means of a rotary encoder, not shown in more detail, which is connected to the shaft 16 and the converter 24 or the B-side end shield 12. At the area of the shaft 16, which extends through the A-side end shield 10, a further component of a press is connected in the assembly state, so that the press is moved by supplying current to the stator 22. Here, a torque of 17,500 Newton meters (Nm) is provided by means of the electric motor 2. The electric motor 2 is preferably a torque motor with integrated electronics, and the converter 24 is in particular appropriately placed on the B-side end shield 12.

Figure 2:
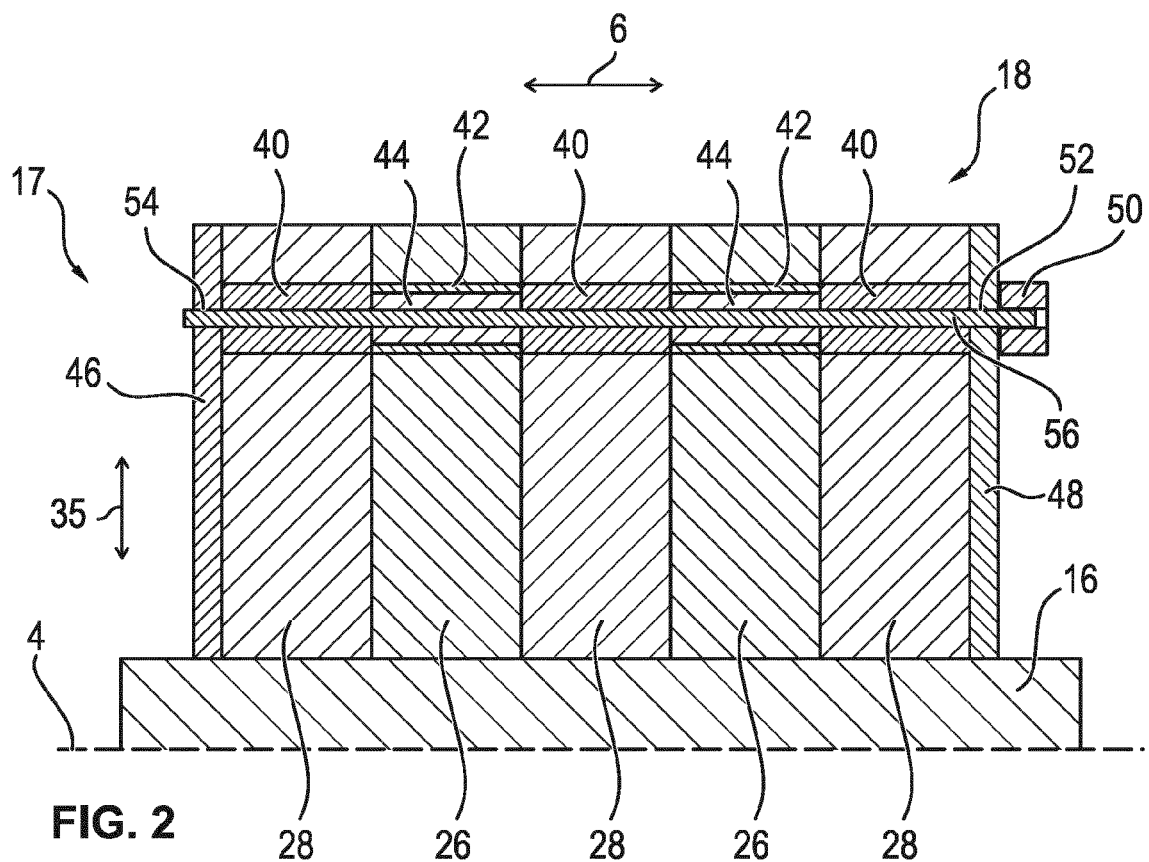
FIG. 2 is a schematically simplified sectional view of the rotor.

FIG. 2 schematically shows, in a sectional illustration in simplified form, a section of the rotor 17 with the shaft 16 and the rotor body 18. The rotor body 18 has a second plurality of first partial bodies 26, the second plurality being equal to 2. Furthermore, the rotor body 18 has a third plurality of second partial bodies 28, the third plurality being 3. The first partial bodies 26 and the second partial bodies 28 are arranged alternately in the axial direction 6, so that the two first partial bodies 26 are surrounded in the axial direction 6 by one of the second partial bodies 28. The partial bodies 26, 28 are placed on the shaft 16 and essentially form the rotor body 18. Each of the partial bodies 26, 28 is in each case a laminated core with laminations not shown in more detail here, which are stacked on each other in the axial direction 6.

The partial bodies 26, 28 are structurally identical, and in FIG. 3, one of these partial bodies 26, 28 is shown in a perspective view. Thus, each partial body 26, 28 has a first hollow cylinder 30 extending in the axial direction 6, and a second hollow cylinder 32 axially extending and circumferentially surrounding the former. On the surface facing away from the second hollow cylinder 32, the first hollow cylinder 30 has two grooves 33 extending in the axial direction 6, which are mutually offset by 180° with respect to the axis of rotation 4. Inside the grooves 33, a feather key is installed in the assembled state, which is also positioned in another groove of the shaft 16. In the assembled state, the first hollow cylinder 30 circumferentially surrounds the shaft 16 and bears directly on it mechanically.

The first hollow cylinder 30 and the second hollow cylinder 32 are connected to one another by means of radially extending spokes 34. In other words, each of the spokes runs in a radial direction 35, wherein the radial direction 35 is defined by means of the axis of rotation 4. The two hollow cylinders 30, 32 and the spokes 34 are formed in this case by means of each lamination of the respective partial body 26, 28. The second hollow cylinder 32 is concentrically disposed with respect to the first hollow cylinder 30 and the axis of rotation 4.

Furthermore, an axially extending third hollow cylinder 36 is arranged between the first hollow cylinder 30 and the second hollow cylinder 32, which is spaced concentrically to the axis of rotation 4 and spaced both from the first hollow cylinder 30 and from the second hollow cylinder 32. The third hollow cylinder 36 is intersected by the spokes 34, such that a plurality of openings 37 are formed between the hollow cylinders 30, 32, 36 and the spokes. Therefore, the weight of the rotor body 18 is comparatively low. At every second intersection of the third hollow cylinder 36 having one of the overall twenty spokes 34 in the tangential direction 38, either a lug 40 or an grommet 42 is positioned. Consequently, each partial body 26, 28 has a total of five lugs 40 and five grommets 42. Each lug 40 is a hollow cylinder which extends in the axial direction 6. Each grommet 42 is also a hollow cylinder, which extends in the axial direction 6, wherein the outer diameter of the grommets 42 is equal to the outer diameter of the lugs 40. However, the inner diameter of the lugs 40 is reduced as compared to the inner diameter of the grommets 42. The lugs 40 and the grommets 42 are at the same distance from the axis of rotation 4.

A connector 44 is pressed into each of the grommets 42, so that the respective connector 44 is pressed together with the respective grommet 42. Each connector 44 is a hollow cylinder, which is made of a plastic, namely polytetrafluoroethylene (PTFE), and which extends in the axial direction 6. The outer diameter of the identical connectors 44 is slightly larger than the inner diameter of the grommet 42, so that a force fit is created between them during assembly.

In summary, the first partial body 26 has a first plurality of grommets 42, within each of which one of the connectors 44 is arranged, wherein the first plurality is equal to 5. The second partial body 28 likewise has five such grommets 42, within each of which one of the connectors 44 is arranged. The second partial body 28 also comprises the first plurality of lugs 40, and the first partial body also comprises the first plurality of lugs 40, namely five.

The rotor body 18 is covered by means of a first cover 46 on the sides of the A-side end shield 10 and by means of a second cover 48 on the sides of the B-side end shield 12, which therefore surround the rotor body 18 in the axial direction 6 and circumferentially align therewith. The two covers 46, 48 are annular disks created from stainless steel and likewise mounted on the shaft 16. The two covers 46, 48 mechanically rest directly on the shaft 16 and the respective outermost second partial bodies 28 and thus mechanically directly on the rotor body 18. The second cover 48 includes a total of ten nuts 50 which are disposed on the side opposite the rotor body 18 and which are spaced the same distance from the axis of rotation 4 as the lugs 40 and the grommets 42.

Further, holes 52 are introduced into the second cover 48, which are each aligned with a central receptacle of the nut 50. Corresponding to the holes 52, the first cover 46 comprises a total of ten bores 54, which are arranged rotationally symmetrical with respect to the axis of rotation 4 and in each case comprise an internal thread.

Furthermore, the rotor 17 has five axes 56 embodied as threaded rods. The axes 56 are arranged in the axial direction 6, and each of the lugs 40 of the second partial body 28 is assigned to one of the axes 56 and receives the latter. One of the connectors 44 associated with the first partial body 26 is also assigned to one of the axes 56, and each of the connectors 44 receives the respective, assigned axis 56. As a result, each of the axes 56 extend through three lugs 40 and two of the connectors 44. The inner diameter of the lugs 40 is slightly larger than the diameter of the five identical axes 56, so that there is clearance between them. A clearance fit is created between each of the connectors 44 assigned to the axles 56.

For assembly, the individual partial bodies 26, 28 are first suitably positioned, and in connection thereto, the threaded rod 56 is inserted through the lugs 40 and the connectors 44. Here, the axes 56 are arranged between the first hollow cylinder 30 and the second hollow cylinder 32. Thus, the axes 56 are also offset to the outside with respect to the shaft 16, in the radial direction 35. The axes 56 are screwed in each case into one of the nuts 50 of the second cover 58 and one of the bores 54 of the first cover 46, so that a force is exerted on the two covers 46, 48 in the axial direction 6 toward one another. As a result, the individual partial bodies 26, 28 are also successively pressed onto one another and are consequently set end-to-end, wherein due to the axes 56, movement of the partial bodies 26, 28 with respect to each other is prevented.

Furthermore, the rotor 17 has five second axes 58, wherein each second axis 58 is received in each case by the lugs 40 of the first partial body 26 and the connectors 44 assigned to the second partial body 28. The second axes 58 are also respectively screwed into one of the nuts 50 and one of the bores 54, so that the two covers 46, 48 are also to pressed towards each other in the axial direction 6 by the five second axes 58.

In FIG. 4, the rotor body 18 is shown in sections. This has chambers 60 which radially adjoin the second hollow cylinder 32 on the outside and are introduced in the first and second partial bodies 26, 28. In this case, the second hollow cylinder 32 forms the radially inner bottom of the chambers 60, each of which have a rectangular cross section with rounded corners with respect to the axis of rotation 4. In this case, the main extension of the rectangular cross section proceeds in the tangential direction 38.

The chambers 60 are mechanically separated from each other and thus not connected. There are a total of sixty such chambers 60 which are arranged rotationally symmetrical with respect to the axis of rotation 4. In addition, each of the partial bodies 26, 28 has, with respect to each of the chambers 60, a radially outwardly displaced pocket 62 which extends in the radial direction 35 and has a rectangular cross section. The main extension of the rectangular cross section extends in the radial direction 35. Thus, each of the partial bodies 26, 28 comprises as many pockets 62 as there are chambers 60. The pockets 62 are separated from one another and are not mechanically connected.

Each pocket 62 itself runs in the axial direction 6 and extends completely through the respective partial body 26, 28. Each pocket 62 is connected by means of an axially extending slot 64 with the associated radially inner chamber 60, wherein as compared to the extension of the pocket 62, the extension of the slot 64 in the tangential direction 38 is reduced by means of two projections 66 aligned in the tangential direction 38. The extension of the chamber 60 in the tangential direction 38 is greater than the extension of the associated pocket 62 in the tangential direction 38. In other words, the chamber 60 in the tangential direction 38 projects beyond the associated pocket 62 in the tangential direction 38 on both sides.

An opening 68 adjoins each pocket 62 on the radial outer side 35, by means of which each pocket 62 is opened. Each opening 68 has a trapezoidal cross section perpendicular to the axis of rotation 4, so that the outer areas lying in the radial direction 35 are offset toward one another. Inside each pocket 62 there is in each case a cuboid magnet 70, which is arranged in the radial direction 35 and is a permanent magnet. The magnets 70 are made of NdFeB. In an alternative, not shown, the magnets 70 are sintered from a ferrite. Each of the partial bodies 26, 28 has a total of sixty magnets 70, and the electric machine 2 thus has a total of three hundred magnets 70 of this type due to the total of five partial bodies 26, 28.

Figure 5:
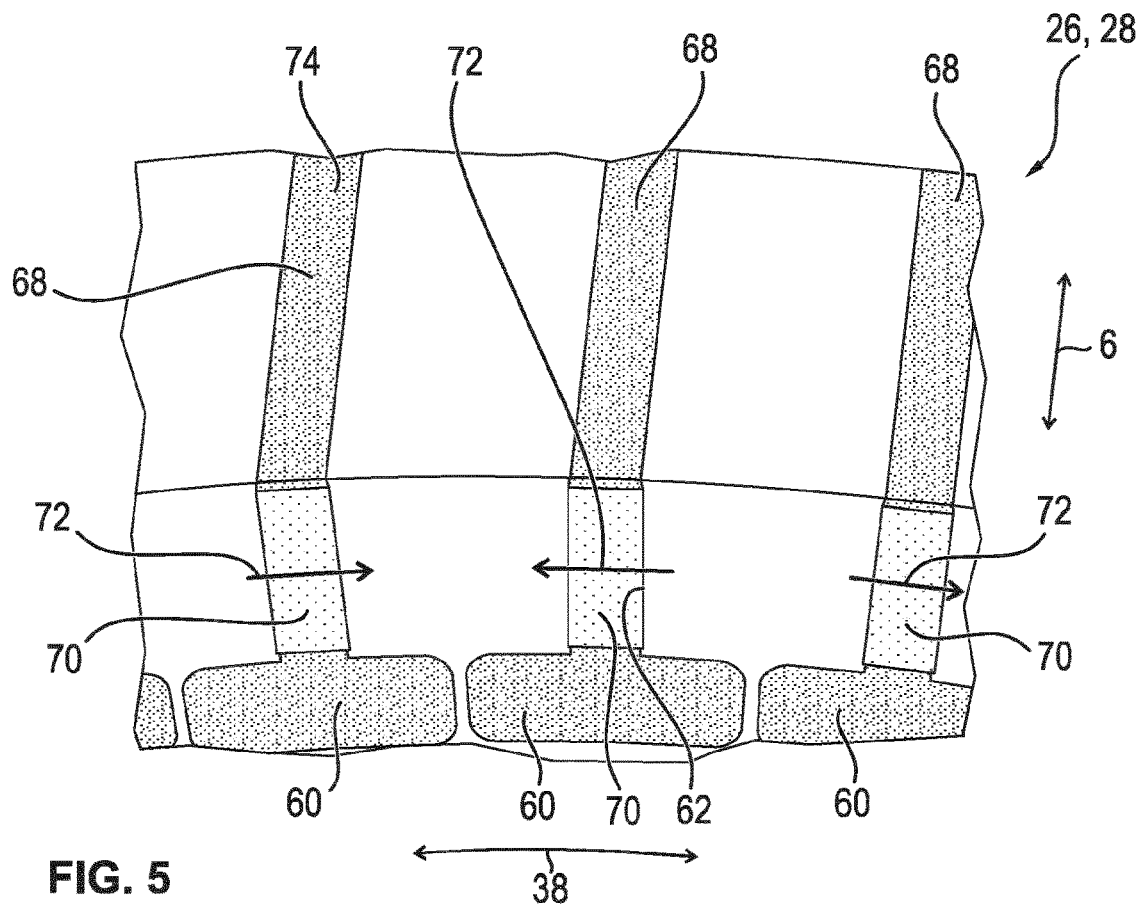
FIG. 5 is a perspective view of a further section of the rotor body.

A clearance fit is created between each pocket 62 and the associated magnet 70, and each of the magnets 70 is provided with a coating of an epoxy resin. In addition, each of the magnets 70 has a magnetization direction 72, which is parallel to the tangential direction 38. In other words, the magnets 70 are magnetized in the tangential direction 38. In summary, each partial body 26, 28 comprises the sixty magnets 70, which are magnetized in the tangential direction 38. The magnetization direction 72 is in each case in the tangential direction 38, opposite of directly adjacent magnets 70, such that the poles of the rotor 18 are formed between each adjacent magnet 70, as shown in FIG. 5. In addition, the chambers 60 in the tangential direction 38 are spaced apart and consequently not connected.

Each of the chambers 60 and each of the openings 68 is filled with a paramagnetic or diamagnetic filler 74 in the form of a potting. The filler 74 is an epoxy resin which, after the partial bodies 26, 28 have been attached to the shaft 16, is filled therein and cured there. In a further alternative, the filler 74 is air.

Due to the chambers 60 and the filler 74, the field lines provided by means of each magnet 70 are forced outwards in the radial direction 35, such that they emerge in each case between the adjacent openings 68 into the air gap 20. A spreading of the magnetic field lines in the radial direction 35 to the inside towards the shaft 16, on the other hand, is prevented or at least reduced. Due to the filler 74 and the webs running between the individual chambers 60, there is nevertheless mechanical integrity of the individual partial bodies 26, 28 and thus of the rotor body 18. The filler 74 has in particular an ideal relative permeability of 1, which is why the magnetic flux of a pole flows from the magnet 70 over the air gap 20 into the stator 22. In the assembled state of the rotor body 17, the partial bodies 26, 28 are joined together in the axial direction 6 such that the chambers 60 and the pockets 62 of neighboring partial bodies 26, 28 are aligned in the axial direction 6. Each of the partial bodies 26, 28 is assigned sixty magnets, which is why the rotor body 18 has a total of three hundred magnets 70. In one alternative, only sixty magnets 70 are present, wherein the length of each magnet 70 in the axial direction 6 corresponds to the length of five partial bodies 26, 28. In this case, each of the magnets 70 projects through all of the partial bodies 26, 28 of the rotor body 18 and is consequently arranged in a total of five of the overall three hundred pockets 62.

Figure 6:
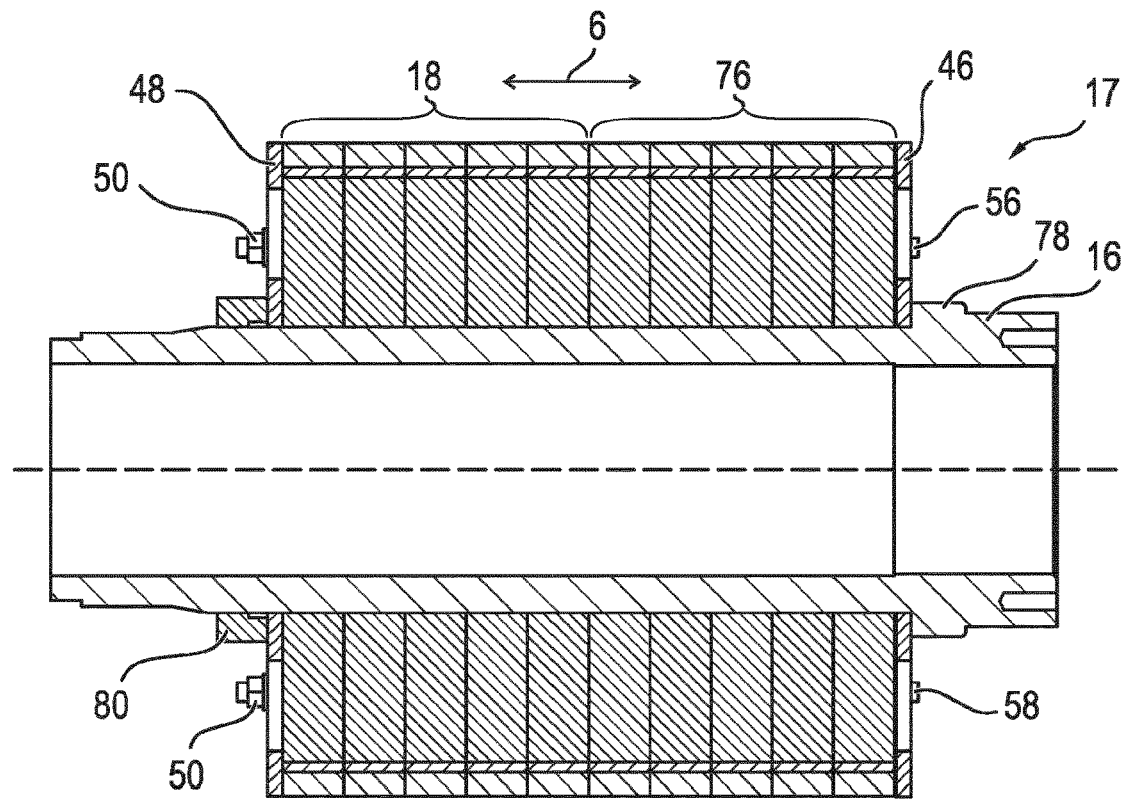
FIGS. 6 and 7 are a schematic and perspective view of an embodiment of the rotor with two rotor bodies.
Figure 7:
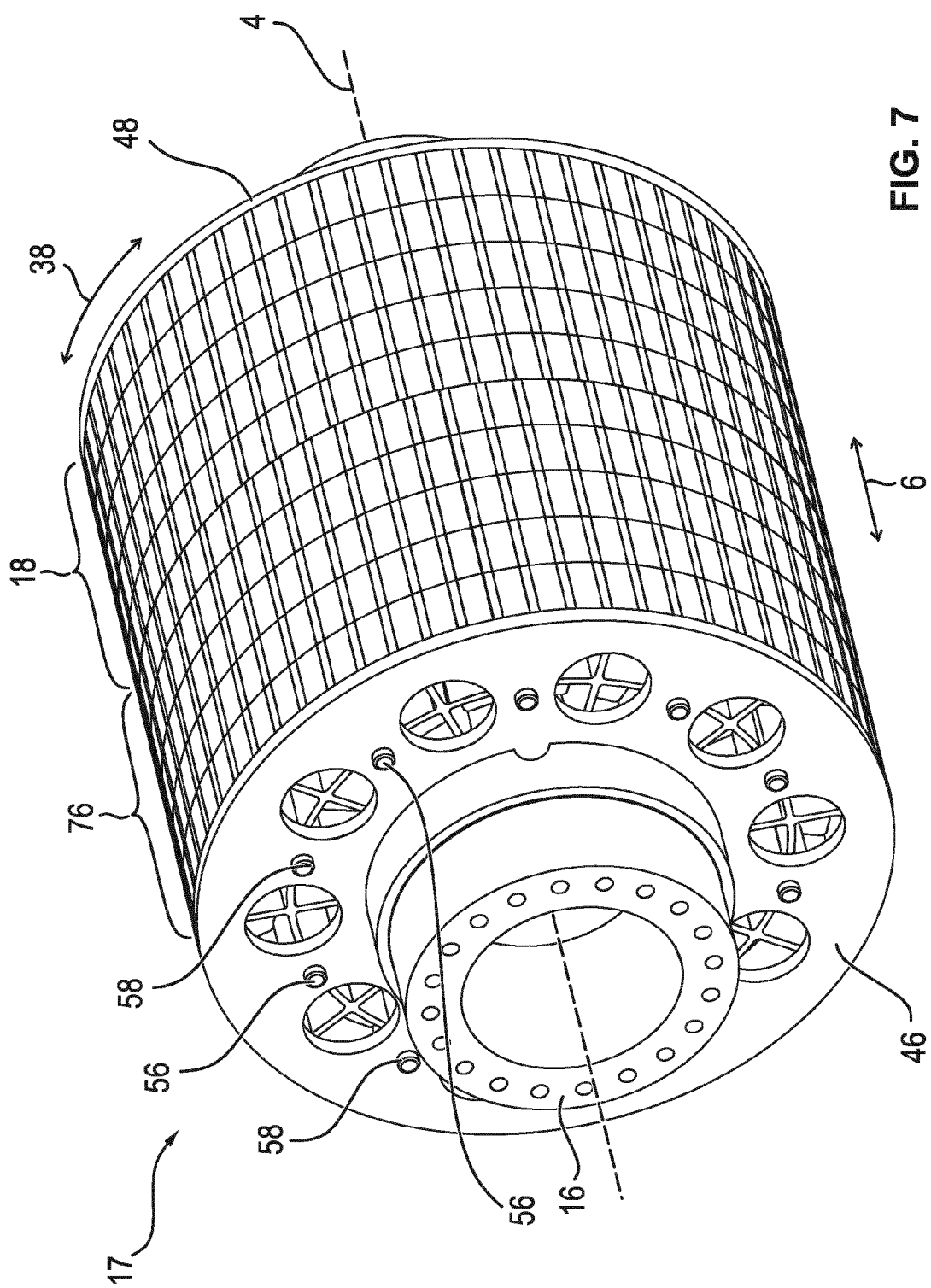

A further embodiment of the rotor 17 is shown in FIGS. 6 and 7. In this case, the rotor 17 comprises the rotor body 18 shown in the previous figures and a structurally identical second rotor body 76, which are arranged adjacent to one another in the axial direction 6 between the two covers 48, 46. The shaft 16 is designed as a hollow shaft and the two rotor bodies 18, 76 are fitted to the shaft 16. For assembly, initially the first cover 46 is plugged onto the shaft 16 until it bears against a shoulder 78. Subsequently, the second rotor body 76, the rotor body 18 and the second cover 48 are placed on the shaft 16. Following this, the axes 56, 58 are inserted through the rotor bodies 18, 76 and their respective partial bodies 26, 28, and fastened by means of the nuts 50 and the bores 54. As a result, the covers 46, 48 and thus the rotor bodies 18, 76, and therefore also the partial bodies 26, 28, are pressed towards one another in the axial direction 6. Subsequently, a sleeve 80 is fitted to the shaft 16 and bonded to the shaft 16. As a result, the rotor bodies 18, 76 or the covers 46, 48 are prevented from detaching from the shaft 16.

In summary, the two rotor bodies 18, 76 are joined to one another in the axial direction 6. The second rotor body 76 is arranged with respect to the rotor body 18 such that the pockets 62 of the rotor body 18 and of the second rotor body 76 are offset from one another in the tangential direction 38. Here, the offset is 0.5°. As a result, the magnets 70 of the two rotor bodies 18, 76 do not align with one another, which is why a torque curve of the electric machine 2 is reduced and at least partially canceled. The second rotor body 76 corresponds to the rotor body 18, which is rotated by 180° with respect to a radially extending axis. The electric machine 2 has two springs that are disposed inside each one of the grooves 33 of the two rotor bodies 18, 76, which are mirror-symmetrical with respect to the axis of rotation 4. The inclination of the rotor 17 is thus not achieved in particular by the offset of the grooves 33 and the springs, but instead by the offset of the pockets by 0.25° to the center plane of the grooves 33. The outer region with the magnets 70 is thus rotated by this angle with respect to an inner region of the rotor 17. Shifting the two rotor bodies 17, 76 by 180° about the radially extending axis results in an offset (=inclination of the rotor) of 0.25°+0.25°=0.5°.

Figure 8:
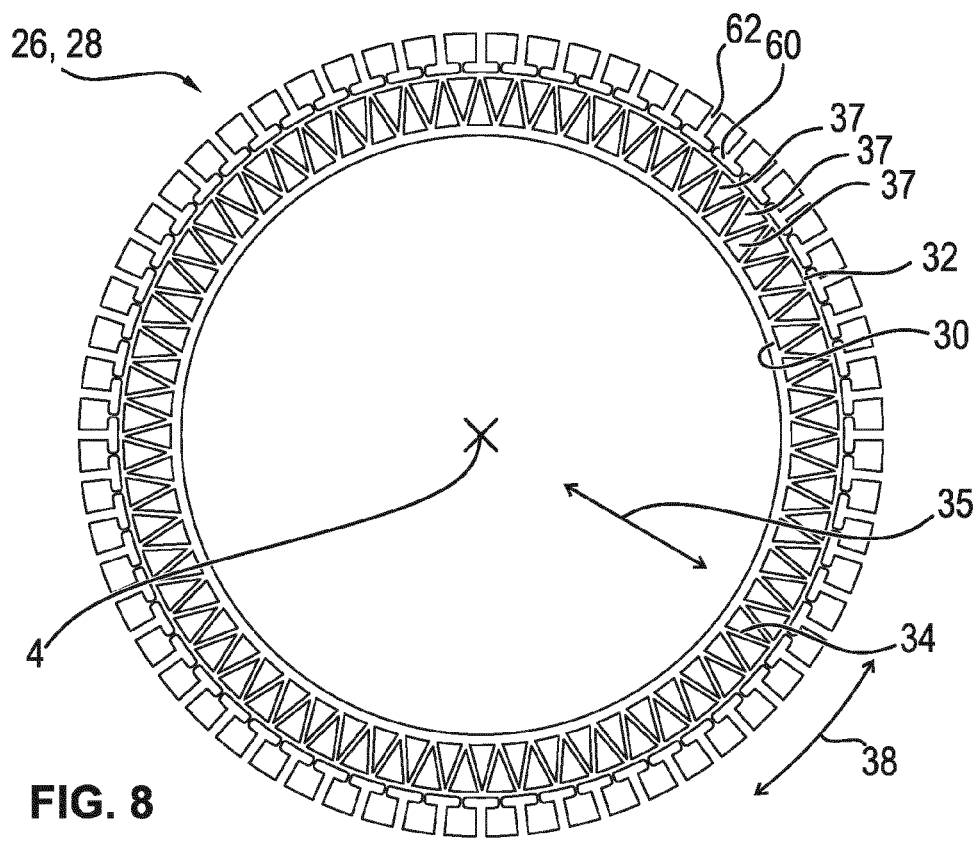
FIGS. 8-12 show a plan view of different embodiments of the rotor body.

FIG. 8 shows a modification of the partial bodies 26, 28. The chambers 60 and the pockets 62 are unchanged. However, the third hollow cylinder 36 is omitted, so that the partial bodies 26, 28 only comprise the first hollow cylinder 30 and the second hollow cylinder 32, between which the spokes 34 are disposed in the radial direction 35. The spokes 34 thus run in both the radial and the tangential directions 35, 38, wherein one of the free ends of each of the adjacent spokes 34 is connected to one another, resulting in a sun-like arrangement of the spokes 34. Also, the first hollow cylinder 30 is offset further to the outside in the radial direction 35 as compared to previous embodiments. As a result, the shape of the openings 37 is changed as compared to the previous embodiments.

Figure 9:
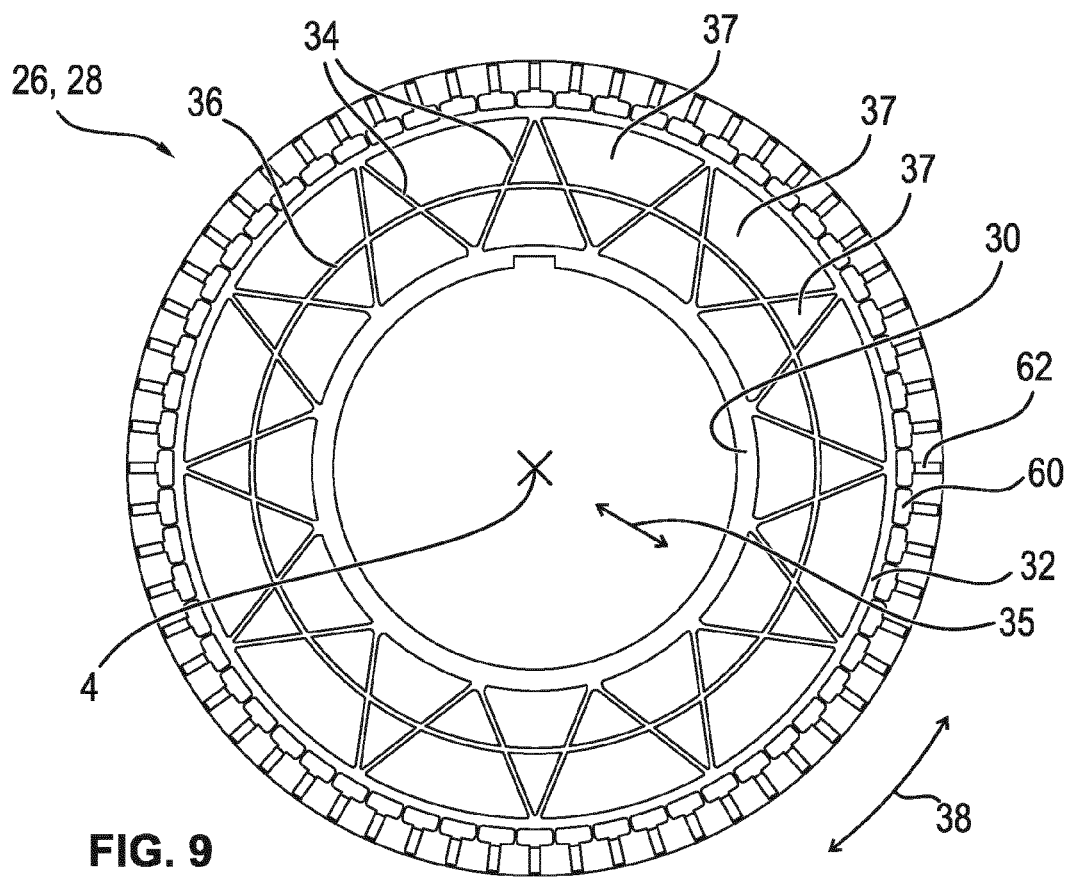

FIG. 9 shows a further embodiment of the partial bodies 26, 28, wherein the chambers 60 and the pockets 62 are in turn left unchanged. Also, the second hollow cylinder 32 in turn forms the radially inner bottom of the chambers 60. The first hollow cylinder 30 is displaced in the radial direction 35 to the inside and substantially has the same inner diameter as the variant shown in FIG. 3. Also, the third hollow cylinder 36 is provided, which is positioned in the radial direction 35 between the first hollow cylinder 30 and the second hollow cylinder 32. The plurality of the spokes 34 is reduced in comparison to the previous embodiment, wherein their progression is in turn also in the radial direction 35 and the tangential direction 38, wherein in each case the free ends of adjacent spokes 34 are connected to each other. The spokes 34 each intersect the third hollow cylinder 36.

Figure 10:
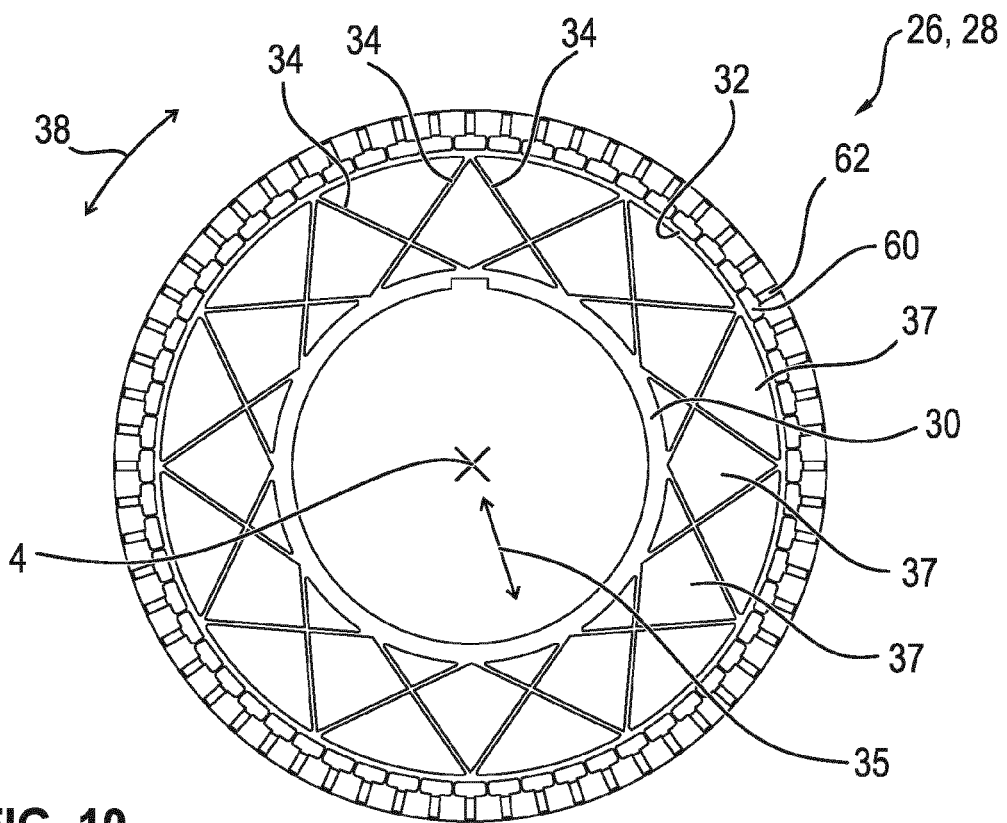

FIG. 10 shows a further embodiment of the partial bodies 26, 28, wherein the pockets 62 and the chambers 60 and the second hollow cylinder 32 are again left unchanged. The first hollow cylinder 30 corresponds to the variant shown in FIG. 9, wherein in comparison hereto, the third hollow cylinder 36 is omitted. Also, the spokes 34 are elongated and have a more pronounced course in the tangential direction 38, so that adjacent spokes 34 intersect between their free ends. Here, the free ends of each next spoke 34 are bonded together. Because of the intersecting, the spokes 34 are stabilized with respect to one another.

Figure 11:
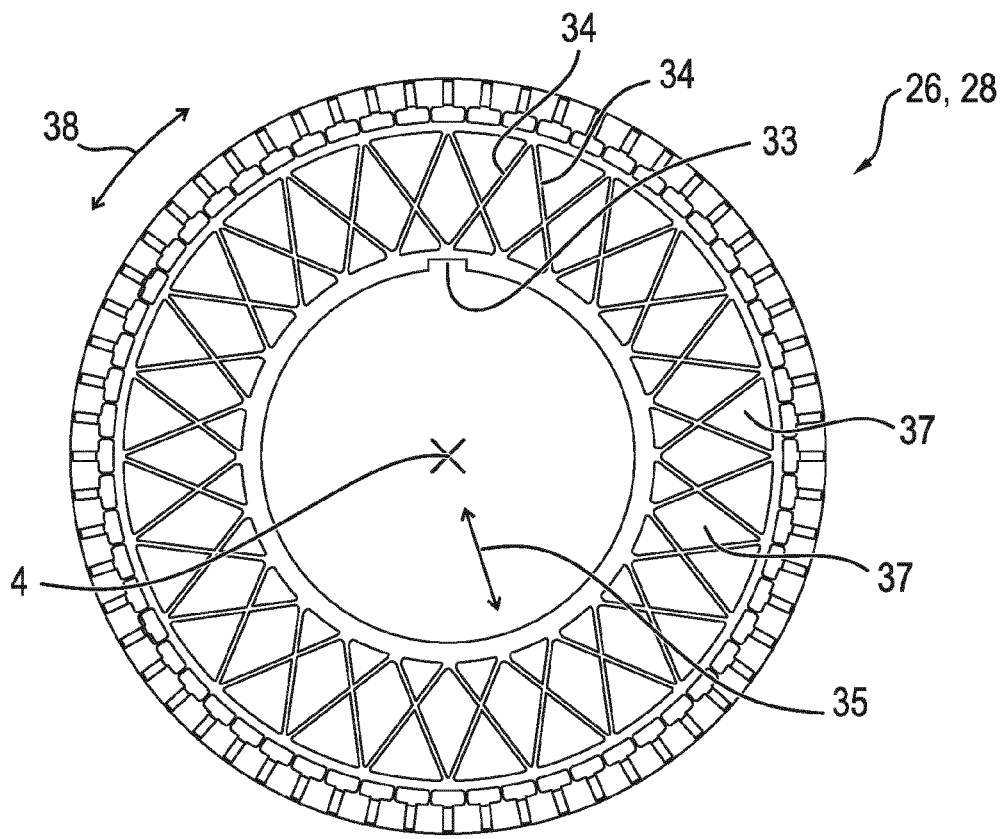

A further embodiment of the partial bodies 26, 28 is shown in FIG. 11. In comparison to the previous embodiment, only the plurality of spokes 34 and their length are changed. Thus, the length substantially corresponds to the length of the spokes 34 shown in FIG. 9, wherein in comparison hereto, however, the plurality of spokes 34 is doubled and the third hollow cylinder 36 is omitted. In each case, two spokes 34 intersect with each other, and each one of the free ends of each spoke 34 is connected to one of the free ends of each next spoke 34 in the tangential direction 38. The openings 37 are therefore reduced in comparison to the previously shown embodiment.

Figure 12:
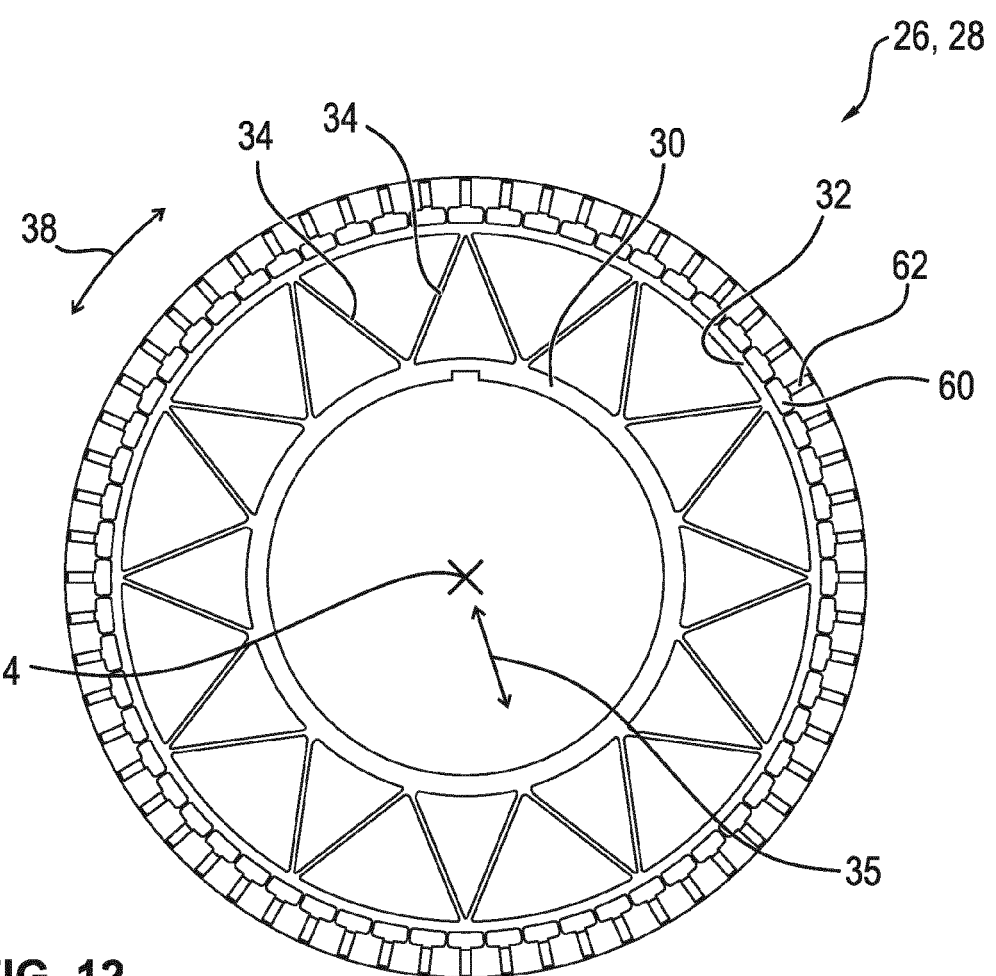

FIG. 12 shows a further embodiment of the structurally identical partial bodies 26, 28. This embodiment corresponds to the variant shown in FIG. 9, with the third hollow cylinder 36 being omitted. Thus, the spokes 34, the first and the second hollow cylinders 30, 32 as well as the chambers 60 and the pockets 62 are left unchanged.

In the variants shown in FIGS. 8 to 12, the lugs 40 and the connectors 44 are not shown. However, these are connected to a part of the spokes 34 according to the arrangement shown in FIG. 3. As a result, these partial bodies 26, 28 are also joined to one another in the axial direction 6 by means of the axes 56 and the second axes 58. In further alternative embodiments, the lugs 40 and/or the grommets 42 are omitted.

Figure 13:
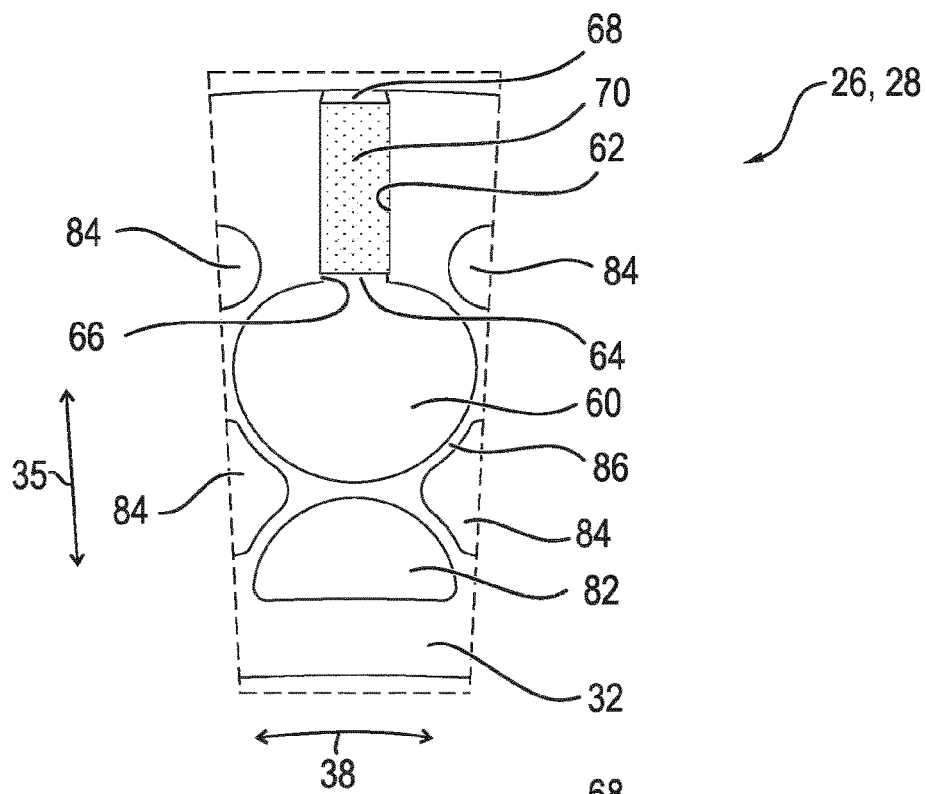
FIGS. 13 and 14 are a sectional and plan view of a further embodiment of the rotor body.
Figure 14:
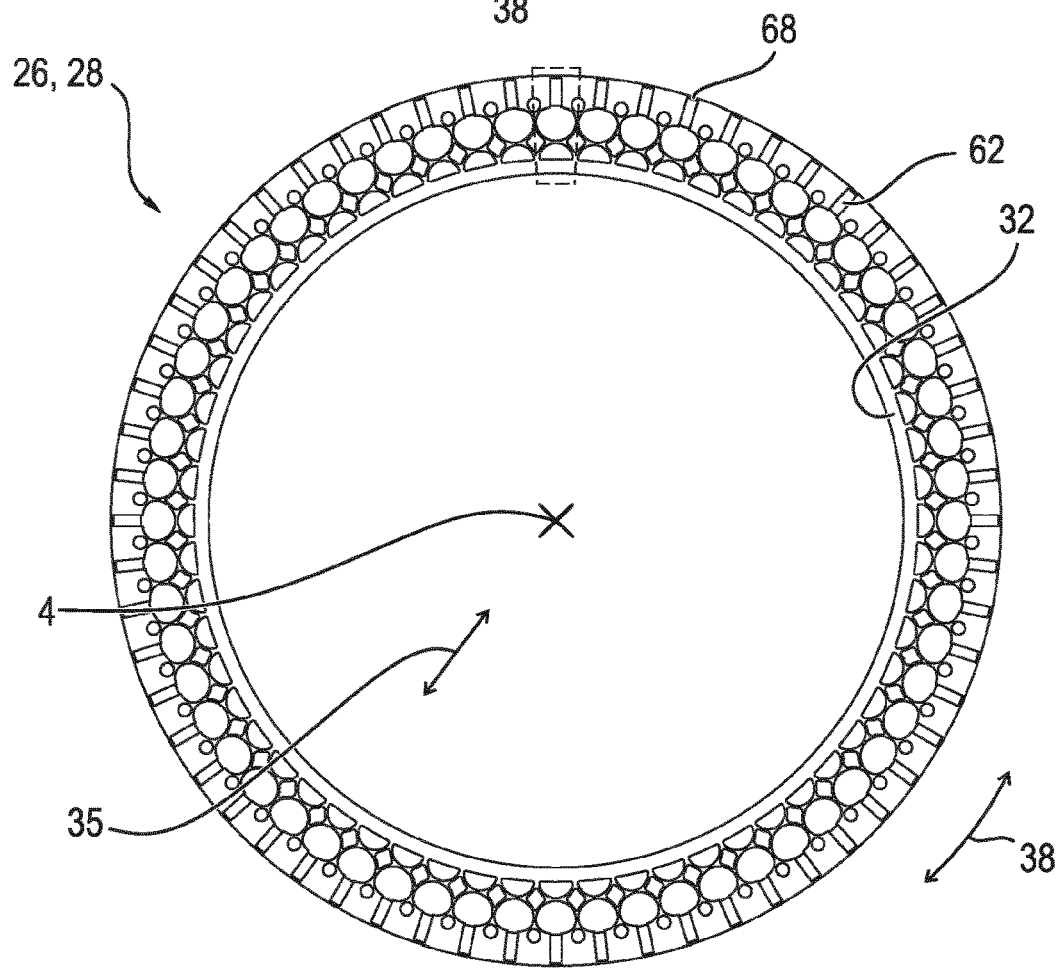

According to the representation of FIG. 4, a section of a further embodiment of the two partial bodies 26, 28 is shown in FIG. 13. FIG. 14 illustrates a larger section thereof, wherein FIG. 13 shows the section indicated in FIG. 14 by means of a dash-dotted line. The pockets 62 as well as the magnets 70 and the openings 68, by means of which the pockets 62 are opened radially outwards, are left unchanged. The slot 64 and the projections 66 are also left unchanged.

The chamber 60 is modified and has a rounded cross section. Thus, none of the edges of the cross-section are straight, but the rounding varies. Also, the chamber 60 is offset radially outward with respect to the second hollow cylinder 32, and between each of the chambers 60 and the second hollow cylinder 32, a first opening 82 is formed in the radial direction 35, the cross section of which is essentially semicircular and the straight bottom of which is formed by means of the second hollow cylinder 32. Furthermore, the partial bodies 26, 28 have further openings 84 which are located in the tangential direction 38 either between adjacent chambers 60 and adjacent first openings 82 or between neighboring chambers 60 and adjacent pockets 62. Here, the cross section of part of the further openings 84 is circular and another part is diamond-shaped. The first opening 82, the further openings 84 and the chamber 60 are separated from one another by means of webs 86, which is why the partial bodies 26, 28 still have mechanical integrity. Because of the further openings 84, penetration of the magnetic field lines provided by means of the magnets 70 is further reduced radially inwards. Adjoining on the radial inner side of the second hollow cylinder 32, according to the variants shown in FIGS. 3 to 12, are the struts 34, the first hollow cylinder 30 and optionally the third hollow cylinder 36. The magnetic flux of the opposite pole is minimized in each case due to the hollow cylinder 32 and the webs 86. Depending on the mechanical design of the webs 86, the mechanical performance is influenced. The mechanical strength is increased by means of the filler 74 and the webs 86 are stabilized.

Figure 15:
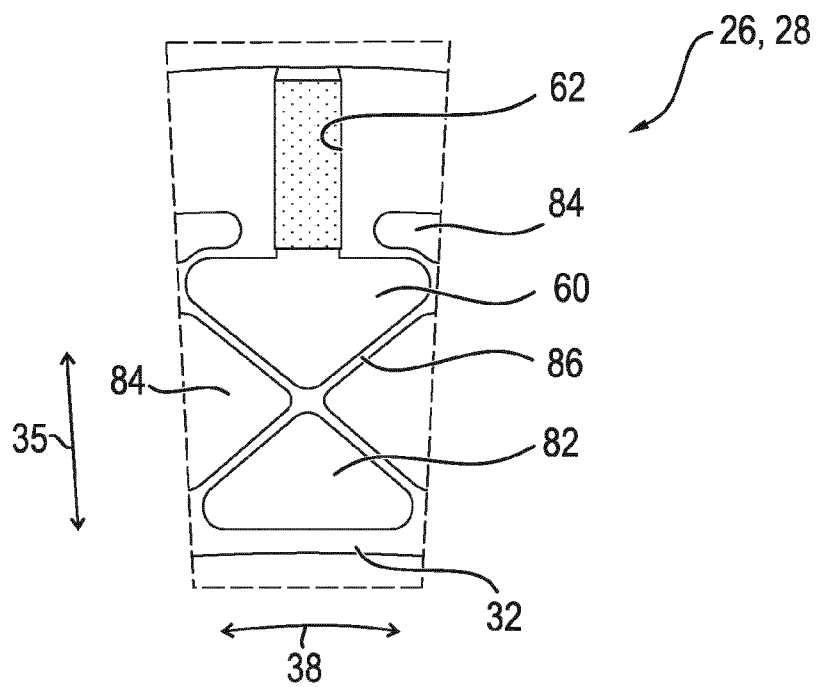
FIGS. 15 and 16 are a sectional and plan view of a further embodiment of the rotor body.
Figure 16:
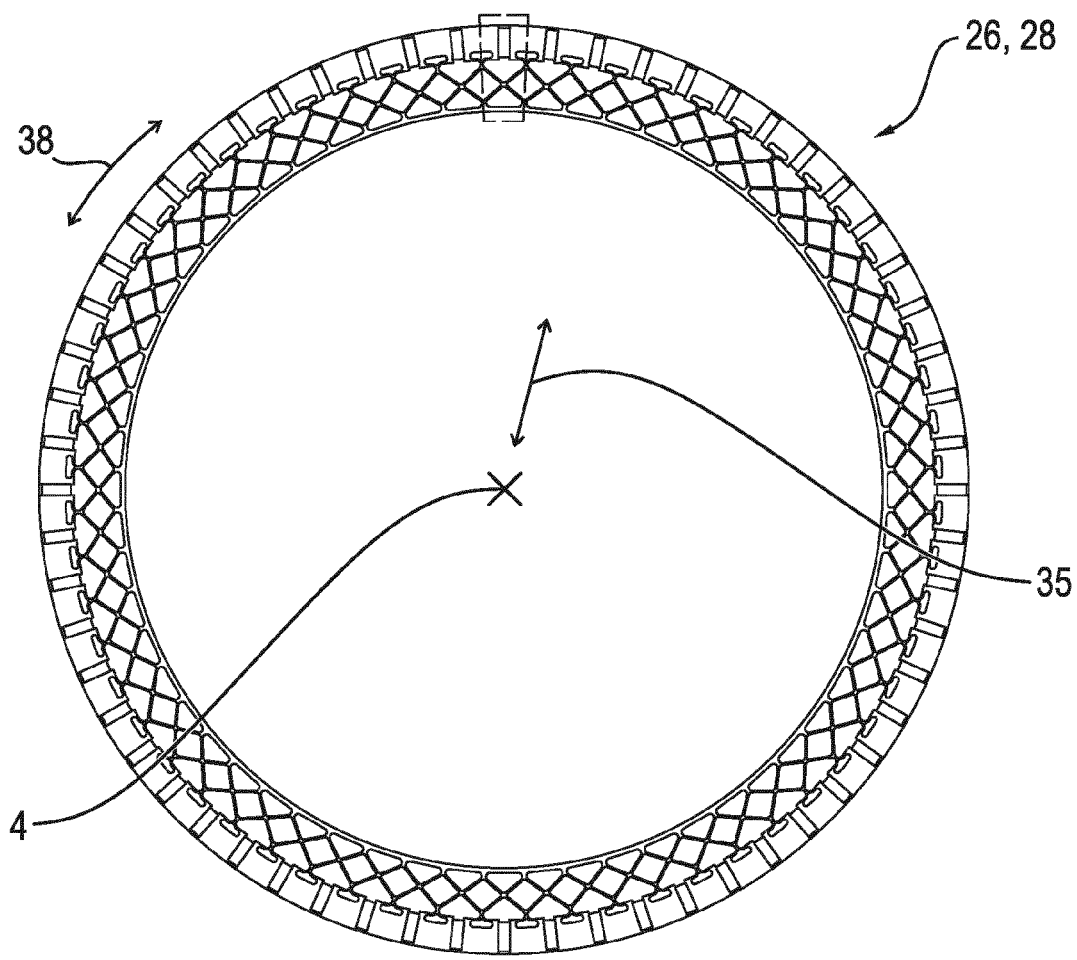

FIG. 15 and FIG. 16 show another embodiment of the partial bodies 26, 28 corresponding to FIGS. 13, 14, wherein here, too, the first hollow cylinder 30, the spokes 34 and optionally the third hollow cylinder 36 are not shown. In comparison to the previous embodiment, the chambers 60, the first openings 82 and the further openings 84 as well as the webs 86 and the second hollow cylinder 32 are modified, only the thickness of the second hollow cylinder 32 being reduced in the radial direction 35. The cross section of the chambers 60 is triangular with rounded corners, the triangle being an isosceles triangle, the tip of which points radially to the inside. The cross section of the first opening 82 is also triangular and corresponds to the cross section of the respectively assigned chamber 60, which, however, is rotated by 180° in such a way that the two tips point towards one another. The webs 86 run essentially in a straight line, both in the radial and in the tangential direction 35, 38, and intersect at an angle of 100°. As a result, part of the further openings 84 is diamond-shaped. The further openings 84 arranged between the pockets 62 are substantially rectangular in cross section. Adjoining on the radial inside of the second hollow cylinder 32, corresponding to the variants shown in FIGS. 3 to 12, are struts 34, the first hollow cylinder 30 and optionally the third hollow cylinder 36.

Figure 17:
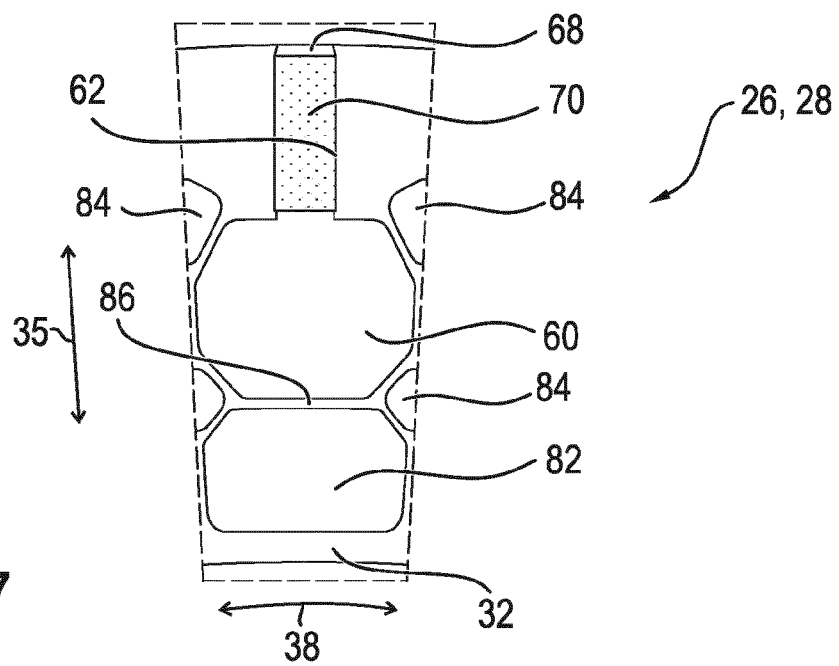
FIGS. 17 and 18 are a sectional and plan view of a final embodiment of the rotor body.
Figure 18:
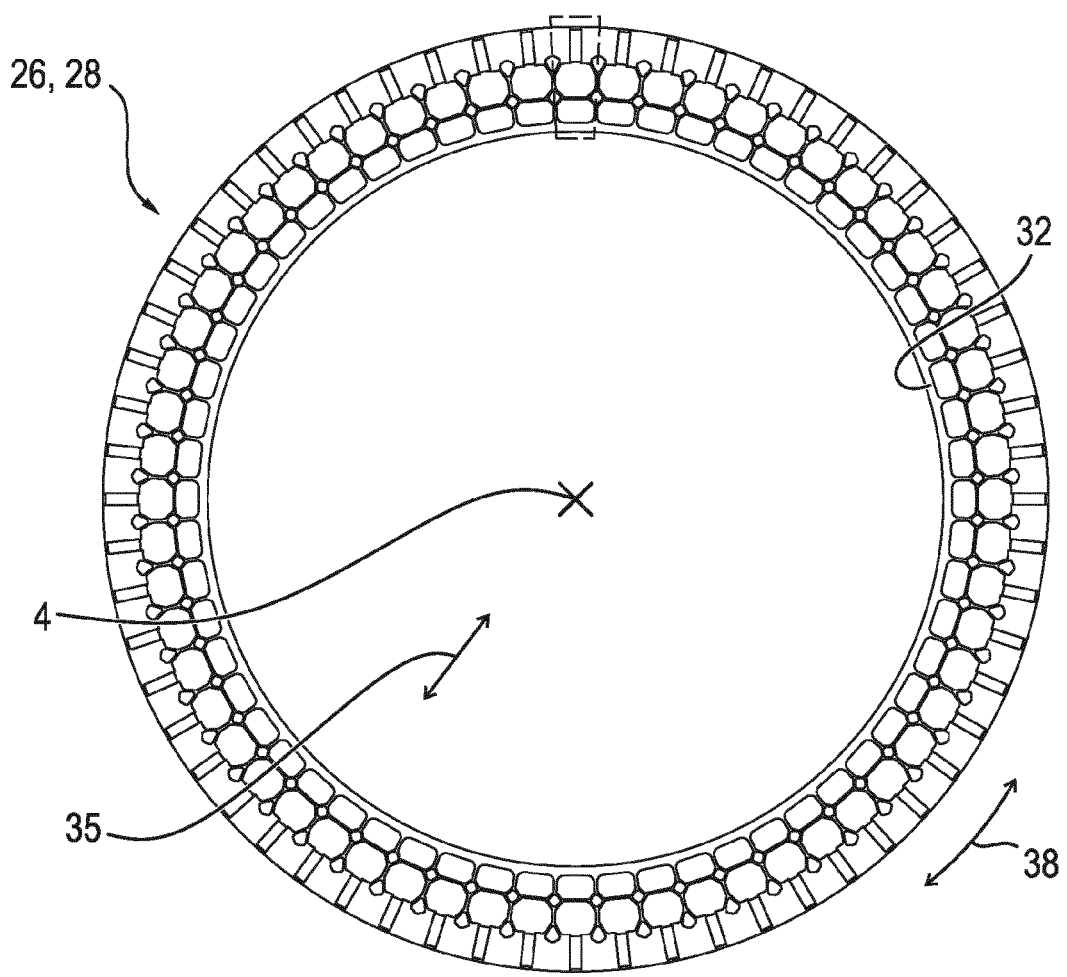

FIG. 17 and FIG. 18 show a last embodiment of the partial bodies 26, 28. In this embodiment, the chambers 60 have a honeycomb cross section. In other words, the cross section is a regular octagon. The cross section of the first opening 82, which is disposed in each case again between the second hollow cylinder 32 and the associated chamber 60, is cuboid or substantially hexagonal. The cross section of the further openings 84 is diamond-shaped or circular. As a result, the webs 86 extend substantially rectilinear, wherein in comparison to the previous embodiment, the plurality of webs 86 is increased. Due to the honeycomb configuration of the chamber 60 with the octagonal cross section, a comparatively high level of robustness is provided. Adjoining on the radial inner side of the second hollow cylinder 32, according to the variants shown in FIGS. 3 to 12, are the struts 34, the first hollow cylinder 30 and optionally the third hollow cylinder 36.

In the embodiments shown in FIGS. 13 to 18, the chambers 60, the first openings 82 and the further openings 84 are preferably filled with the filler, which is epoxy resin. As a result, the mechanical integrity of the partial bodies 26, 28 is further increased.

In summary, due to the design of the partial bodies 26, 28, magnetic resistance is increased, which leads to increased torque. Due to the design of the chambers 60 and the struts 86 and the spokes 34, however, comparatively high strength is provided. Because of the different geometries, there is a comparatively high mechanical rigidity, and the magnetic resistance in the struts, in particular the struts 86 and the spokes 34 is increased, which is why an increased torque is achieved. Also, the electric machine 2 designed as an inner rotor has a so-called "spoke design" due to the radial arrangement of the magnets 70.

The invention is not limited to the exemplary embodiments described above. Rather, other variants of the invention can also be derived therefrom by the person skilled in the art without departing from the subject matter of the invention. In particular, all individual features described in connection with the various exemplary embodiments can also be combined with one another in other ways without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotor of an electric machine, the rotor comprising:
a rotor body circumferentially surrounding a shaft; and
at least two magnets, each of the at least two magnets being arranged within a radially extending pocket of the rotor body,
wherein each of the pockets is connected by an axially running slot with a radially inner chamber of the rotor body,
wherein the rotor body comprises an axially extending first hollow cylinder and an axially extending second hollow cylinder arranged in the radial direction between the first hollow cylinder and the inner chambers, and
wherein the first hollow cylinder and the second hollow cylinder are connected to one another by radially extending spokes, the radially extending spokes defining a plurality of openings in the second hollow cylinder.

2. The rotor according to claim 1, wherein the cross section of each chamber is rounded or is a regular polygon.

3. The rotor according to claim 1, wherein the extension of each chamber in the tangential direction is greater than the extension of the associated pocket in the tangential direction.

4. The rotor according to claim 1, wherein a clearance fit is created between each pocket and the associated magnet and/or wherein the magnets are magnetized in the tangential direction.

5. The rotor according to claim 1, wherein each chamber is filled with a paramagnetic or diamagnetic filler, and/or wherein the rotor body is a laminated core.

6. The rotor according to claim 1, wherein each pocket has a radially outer opening, a cross section of which is trapezoidal.

7. The rotor according to claim 1, wherein the magnets are cuboid, and/or wherein the plurality of the magnets is between 40 and 80, or equal to 60.

8. The rotor according to claim 1, further comprising a structurally identical second rotor body, which is joined to the rotor body in the axial direction, wherein the pockets of the rotor body and of the second rotor body are offset to one another in the tangential direction.

9. An electric machine, comprising a rotor according to claim 1; and a stator surrounding the rotor on a circumference thereof.

10. The rotor according to claim 1, wherein the rotor body has an axially extending third hollow cylinder arranged in the radial direction between the first hollow cylinder and the second hollow cylinder.

11. The rotor according to claim 1, wherein the spokes run radially and tangentially.

12. The rotor according to claim 1, wherein a clearance is disposed between each pocket and an associated one of the magnets in each pocket, at least in a tangential direction.

13. The rotor according to claim 1, wherein the rotor body is composed of five partial bodies, each of the plurality of bodies being a lamination core with laminations.

14. The rotor according to claim 1, wherein the first hollow comprises two grooves extending in an axial direction.

15. The rotor according to claim 14, wherein the two grooves are offset 180°.

16. The rotor according to claim 1, wherein each chamber is filled with epoxy resin.

17. A rotor of an electric machine, the rotor comprising:
a rotor body circumferentially surrounding a shaft; and
at least two magnets, each of the at least two magnets being arranged within a radially extending pocket of the rotor body,
wherein each of the pockets is connected by an axially running slot with a radially inner chamber of the rotor body,
wherein the rotor body comprises an axially extending first hollow cylinder and an axially extending second hollow cylinder, which is arranged in the radial direction between the first hollow cylinder and the chambers,
wherein the first hollow cylinder and the second hollow cylinder are connected to one another by radially extending spokes,
wherein the spokes run radially and tangentially, and/or
wherein the rotor body has an axially extending third hollow cylinder, which is arranged in the radial direction between the first hollow cylinder and the second hollow cylinder.

18. A rotor of an electric motor, the rotor comprising:
a shaft;
a rotor body surrounding a circumference of the shaft, the rotor body comprising:
a plurality of inner chambers;
a plurality of radially extending pockets, each of the radially extending pockets having an axially extending slot, each of the extending slots being connected to one of the plurality of inner chambers;
an axially extending first hollow cylinder;
an axially extending second hollow cylinder arranged in a radial direction between the first hollow cylinder and the plurality of inner chambers;

at least partially radially running spokes connecting the first hollow cylinder and the second hollow cylinder, the spokes extending radially and tangentially;

an axially extending third hollow cylinder arranged in the radial direction between the first hollow cylinder and the second hollow cylinder; and a plurality of magnets, each magnet being arranged within the radially extending pockets of the rotor body.

19. A rotor, comprising:

a shaft;

a rotor body circumferentially surrounding the shaft, the rotor body comprising:
- a plurality of inner chambers;
- a plurality of radially extending pockets, each of the radially extending pockets having an axially extending slot, each of the extending slots being connected to one of the plurality of inner chambers;
- an axially extending first hollow cylinder;
- an axially extending second hollow cylinder arranged in the radial direction between the first hollow cylinder and the plurality of inner chambers; and
- an axially extending third hollow cylinder arranged in the radial direction between the first hollow cylinder and the second hollow cylinder; and magnets arranged within the radially extending pockets.

20. A rotor of an electric machine, the rotor comprising:

a rotor body circumferentially surrounding a shaft; and at least two magnets, each of the at least two magnets being arranged within a radially extending pocket of the rotor body, wherein each of the pockets is connected by an axially running slot with a radially inner chamber of the rotor body, wherein the rotor body comprises an axially extending first hollow cylinder and an axially extending second hollow cylinder, which is arranged in the radial direction between the first hollow cylinder and the chambers, wherein the first hollow cylinder and the second hollow cylinder are connected to one another by radially extending spokes, wherein the spokes run radially and tangentially.

* * * * *